United States Patent [19]

Patino et al.

[11] Patent Number: 5,732,144
[45] Date of Patent: Mar. 24, 1998

[54] REMOTE MICROPHONE DISPLAY SELECT SYSTEM AND METHOD OF USING SAME

[75] Inventors: Joseph Patino, Pembroke Pines; Bruce D. Oberlies, Coral Springs, both of Fla.; Michael P. Stock, Palatine, Ill.

[73] Assignee: Motorola, Inc., Schaumburg, Ill.

[21] Appl. No.: 673,885

[22] Filed: Jul. 1, 1996

[51] Int. Cl.[6] .................................................. H04R 1/02
[52] U.S. Cl. .................................................. 381/91; 381/122
[58] Field of Search .................................. 381/168, 91, 122, 381/87, 123; 455/186

[56] References Cited

U.S. PATENT DOCUMENTS

| | | | |
|---|---|---|---|
| 3,611,140 | 10/1971 | Shimada | 325/15 |
| 3,659,050 | 4/1972 | Carlsson et al. | 179/1 HF |
| 4,178,488 | 12/1979 | Nishihata | 179/100 |
| 4,325,142 | 4/1982 | Nakazawa | 455/89 |
| 4,495,652 | 1/1985 | Leslie | 455/234 |
| 4,550,343 | 10/1985 | Nakatani | 381/122 |
| 4,647,722 | 3/1987 | Nishida et al. | 379/63 |
| 4,845,772 | 7/1989 | Metroka et al. | 379/61 |
| 4,984,295 | 1/1991 | Engstrom et al. | 455/186 |
| 5,175,869 | 12/1992 | Murata | 455/66 |
| 5,276,916 | 1/1994 | Pawlish et al. | 455/89 |

FOREIGN PATENT DOCUMENTS 2 215 163   9/1989   United Kingdom .

*Primary Examiner*—Curtis Kuntz
*Assistant Examiner*—Vivian Chang
*Attorney, Agent, or Firm*—Frank M. Scutch, III

[57] ABSTRACT

A remote microphone display select system (200) used with a two-way radio (201) for controlling the orientation of displayed information includes a remote microphone (101) which is electrically connected to a display driver (203). A hall effect switch (207) is used with the display driver (203) and acts to alter the orientation of displayed information on a display (106) to either a first orientation or second orientation when the hall effect switch (207) is disabled.

2 Claims, 2 Drawing Sheets

REMOTE MICROPHONE DISPLAY SELECT SYSTEM AND METHOD OF USING SAME

TECHNICAL FIELD

This invention relates in general to portable radios and more particularly to remote microphones for portable radios.

BACKGROUND

A common accessory used with portable hand held two-way radio equipment is a remote microphone sometimes called a speaker microphone or "speaker mic". The speaker microphone enables the user to remote both the radio's speaker and microphone to a location where both the speaker and microphone are easier for the user to use. This location is generally around the head, closer to the ears and mouth. Additionally, the remote speaker microphone may also include an integrated external radio frequency (RF) antenna mounted to the remote speaker mic for use by the attached transmitter.

Today's remote speaker microphones (RSM) and public safety microphones (PSM) are typically used in two applications. The microphones are either held in the hand directly in front of the users face or they are pinned on the users lapel. As is evident during use, the display that is often used with the speaker mic faces in two directions depending on how the microphone is used. When pinned to the lapel, the display faces in one direction while when used directly in front of the user's mount, it is in an opposite direction—turned 180 degrees. Thus a problem exists in selecting the order in which information is presented on the display. Depending on that selection, the user must read the information upside down depending on the position of the microphone.

Therefore, the need exists for a microphone which can self adjust the information presented on a microphone display depending on the position of the microphone in relation to the user. Thus, a device is needed to alter the information displayed on the remote microphone display depending on whether it is located in front of user's mouth or attached to the user's body.

DETAILED DESCRIPTION OF THE PREFERRED EMBODIMENT

Figure 1:
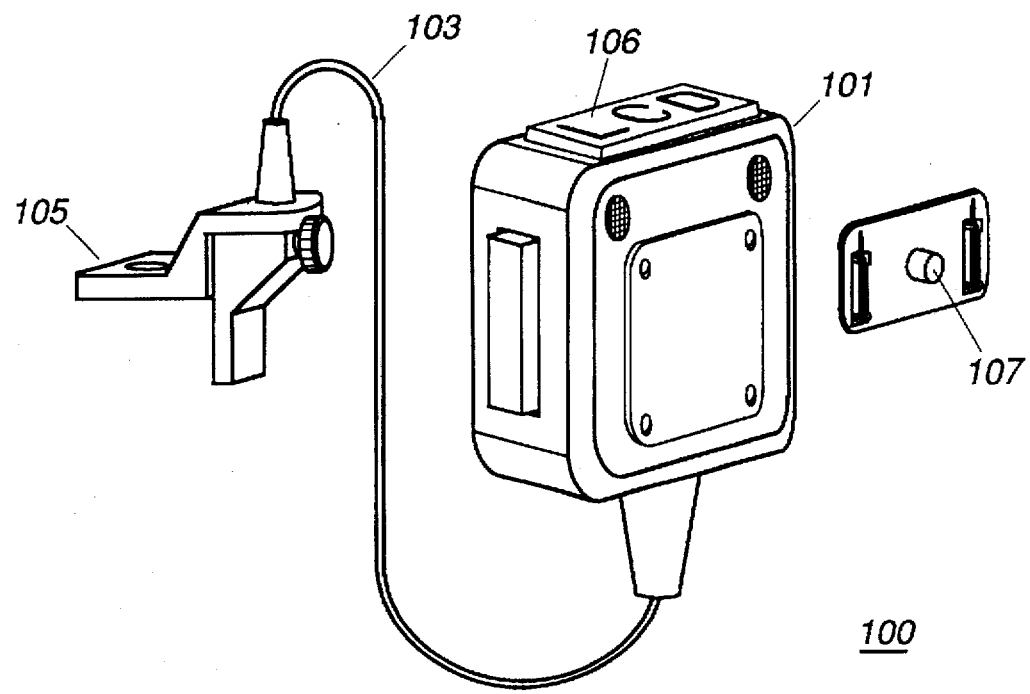
FIG. 1 is an isometric view of a remote speaker microphone used with a hall effect switch in accordance with the invention.

Referring now to FIG. 1, the remote microphone display select system 100 includes a remote microphone 101 such as a speaker microphone or the like which is connected through a cable 103 to a microphone connector 105. As is well known in the art, the remote microphone is typically used with a portable two-way portable radio transceiver or the like. The microphone connector 105 connects directly to a corresponding connector on the radio housing (not shown). Included within the remote microphone 101 a hall effect switch (not shown) is used to control the switching and orientation of information displayed on a display 106 that is located within the radio housing. As seen in FIG. 1, the orientation of the information is such so that a user may read the information when facing the rear 111 of the microphone 101.

In order to change the orientation of the information on the display 106, the hall effect switch is actuated using a standard type magnet 107. The standard type magnet 107 produces a magnetic field and is typically used with a some type of fastener such as a small amount of hook and loop material, a pin, a clip or the like. As known to those skilled in the art, the fastener is typically secured to the shoulder of the user's body, however any location where the remote microphone can be suitably fastened and still receive the user's voice would be acceptable.

In operation, when the remote microphone 101 is moved in the proximity of magnet 107, this actuates the hall effect switch enabling a microphone display circuit, located within the microphone 101, to switch from a first display orientation to a second display orientation. Though the use of this microphone system and method, if the user wishes to have the remote microphone 101 remain attached to the fastener, on their shoulder for example, the first display orientation will be used as seen in FIG. 1.

Figure 2:
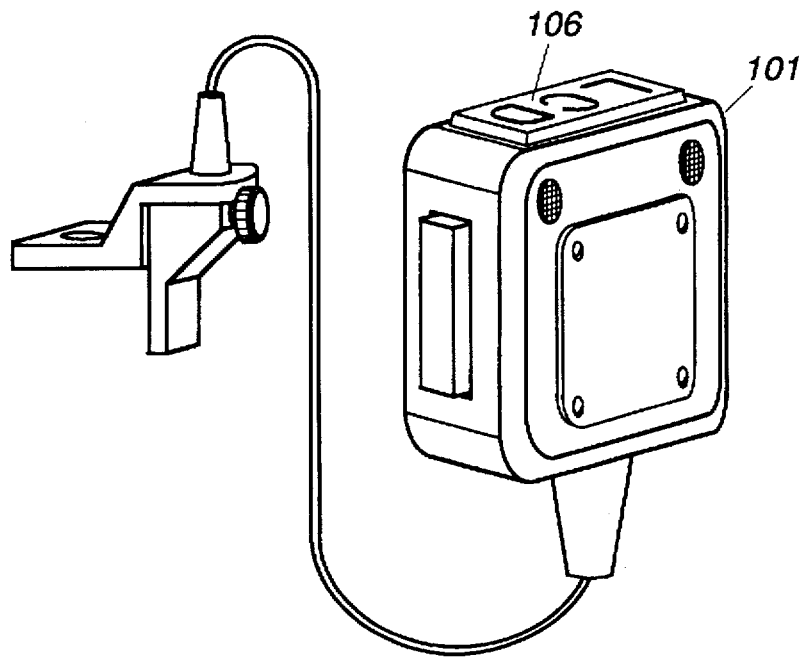
FIG. 2 is an isometric view of the remote speaker microphone shown in FIG. 1 where the hall effect switch is not activated and the display orientation is reversed.

If the user were to remove the remote microphone from the fastener, moving it outside the proximity of the magnet 107, this would enable the second display orientation to be used as seen in FIG. 2. This will be particularly useful when the microphone is used directly in front of the user's mouth. This enables the user to continually be able to read the displayed information on the display 106 no matter if the microphone 101 is used on the user's lapel or if turned to be used to directly speak into the microphone element.

Figure 3:
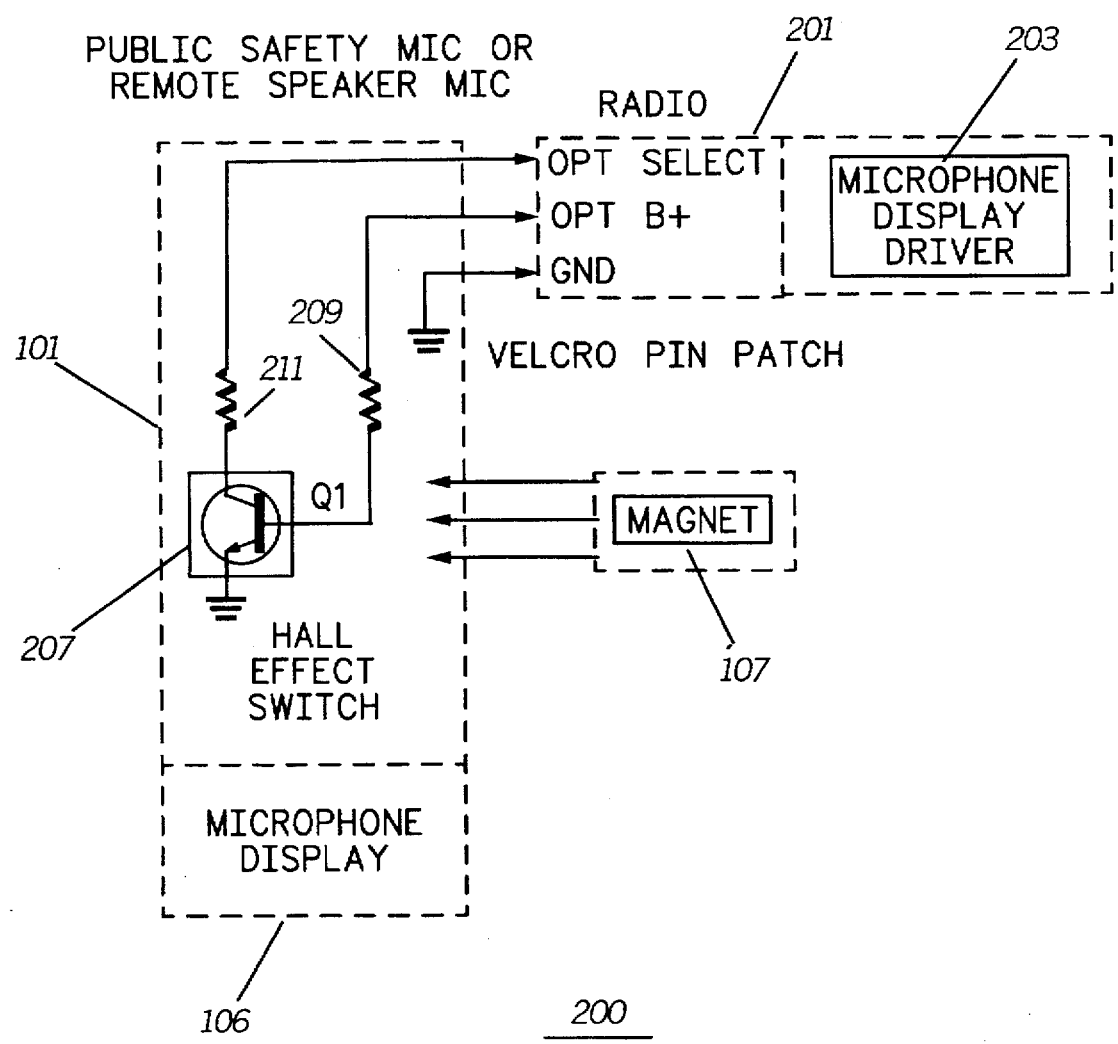
FIG. 3 is a block diagram showing operation of the remote speaker microphone with a hall effect switch used to control orientation of display information in accordance with the invention.

Referring now to FIG. 3, a block diagram is shown which illustrates the remote microphone display select system 200 as used with the present invention. As noted above, the remote microphone 101 is connected to a two-way radio 201. The radio 201 is preferably a portable-type radio which can optimize the advantages of either a remote speaker microphone or remote microphone 101.

As is well known in the art, a microphone display driver 203 is located either within the radio 201 or within the remote microphone 101. The microphone display driver 203 acts to control the display information and orientation of the display 106. As is known in the art, the display 106 may include a variety of display types such as light emitting diodes (LED), liquid crystal display (LCD), gas discharge display or the like.

In the preferred embodiment, a hall effect switch 207, located within the remote microphone 101, senses the presence or absence of the magnet 107. As indicated above, the magnet 107 is typically located on a fastener attached to the user's clothing near the resting position of the microphone 101. This allows the remote microphone 101 to detect or sense if it is in the proximity of the magnet 107 and thus on a user's lapel. The microphone display driver 203 is be controlled externally through use of the OPT SEL, and GND lines located on the radio 201.

In the situation when the microphone is in the proximity of the magnet 107, the magnet 107 acts to activate the hall effect switch 207. The hall effect switch 207 is represented by a hall effect NPN transistor which is biased by resistor 209. This acts to pull the base of the hall effect switch 207 to a LOW state provided the a voltage is present on the OPT B+ line and a magnetic field is near hall effect switch 207. When these conditions are met, resistor 211 pulls the OPT SEL line via hall effect switch 207 to ground. The OPT SEL line is used by the radio 201 to select the required LCD configuration when the display driver 203 is located in the radio 201. As noted above, this configuration will most often be used in situations where the remote microphone 101 is positioned on the user's lapel and the information on the display 106 is required to be oriented so as to be read by the user while in that position. Thus, the user will not have to remove the microphone from the lapel, and turn the displayed information 180 degrees, in order to read information on the display 106.

In the event the remote microphone 101 is removed from the proximity of the magnet 107, this condition is sensed by the hall effect switch 207. This causes the base of the hall effect switch 207 to move to a HIGH state. Resistor 211 is now allowed to float high, which causes the display to now be oriented 180 degrees. Hence, in this configuration the information is displayed on the display 106 in applications were the remote microphone 101 is held in front of the user's face and mouth. In this fashion information displayed on the display 106 can be optimized for both applications without having to sacrifice one application or the other.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of altering the orientation of information on a remote microphone display used with a two-way radio between a first orientation and a second orientation, comprising the steps of:

providing a remote microphone display connected to a display driver;

connecting a hall effect switch located within a remote microphone to the display driver for switching the orientation of displayed information between the first orientation and the second orientation;

enabling the hall effect switch allowing information on the remote microphone display to maintain the first orientation by moving the remote microphone within a proximity of a magnetic field located on a user's body; and disabling the hall effect switch allowing information on the remote microphone display to maintain the second orientation when moving the remote microphone outside a proximity of the magnetic field.

2. A method of altering the orientation of information as in claim 1, wherein the enabling step includes utilizing the first orientation when the remote microphone is attached substantially near a user's shoulder and using the second orientation when the microphone is held near a user's mouth.

* * * * *